US008615756B2

(12) United States Patent
Dan

(10) Patent No.: US 8,615,756 B2
(45) Date of Patent: Dec. 24, 2013

(54) SERVER DEVICE AND COMPUTER-READABLE RECORDING MEDIUM FOR GENERATING A DRIVER PACKAGE

(75) Inventor: Koji Dan, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 250 days.

(21) Appl. No.: 13/143,165

(22) PCT Filed: Nov. 20, 2009

(86) PCT No.: PCT/JP2009/006281
§ 371 (c)(1),
(2), (4) Date: Jul. 1, 2011

(87) PCT Pub. No.: WO2010/089826
PCT Pub. Date: Aug. 12, 2010

(65) Prior Publication Data
US 2011/0283275 A1 Nov. 17, 2011

(30) Foreign Application Priority Data
Feb. 5, 2009 (JP) ................................ 2009-025293

(51) Int. Cl.
*G06F 9/445* (2006.01)
*G06F 15/16* (2006.01)

(52) U.S. Cl.
USPC ............ 717/176; 717/174; 709/201; 709/203

(58) Field of Classification Search
USPC .......................... 717/174–178; 709/201–203
See application file for complete search history.

(56) References Cited

U.S. PATENT DOCUMENTS 6,266,811 B1 * 7/2001 Nabahi ......................... 717/174
6,282,711 B1 * 8/2001 Halpern et al. ............... 717/175
7,610,583 B2 * 10/2009 Milius .......................... 717/177

(Continued)

FOREIGN PATENT DOCUMENTS

| EP | 1 724 682 A1 | 11/2006 |
|---|---|---|
| JP | 11 282653 | 10/1999 |
| JP | 2000-242471 A | 9/2000 |
| JP | 2001 005622 | 1/2001 |
| JP | 2003 288210 | 10/2003 |
| JP | 2004-127281 A | 4/2004 |
| JP | 2004 265061 | 9/2004 |
| JP | 2005 148976 | 6/2005 |
| JP | 2006 244009 | 9/2006 |
| JP | 2006 350443 | 12/2006 |
| JP | 2006 350910 | 12/2006 |
| JP | 2007 115257 | 5/2007 |
| JP | 2007 164543 | 6/2007 |
| JP | 2008 251009 | 10/2008 |
| JP | 2008 268502 | 11/2008 |

OTHER PUBLICATIONS

International Search Report issued Feb. 9, 2010 in PCT/JP09/006281 filed Nov. 20, 2009.
Extended European Search Report issued Sep. 5, 2011, in European Patent Application No. 09839604.7.
Office Action issued Jun. 4, 2013 in Japanese Patent Application No. 2009-025293.

*Primary Examiner* — Qing Chen
(74) *Attorney, Agent, or Firm* — Oblon, Spivak, McClelland, Maier & Neustadt, L.L.P.

(57) ABSTRACT

A server device, which provides a client device with a driver package including a core module of a driver, includes a storage unit for storing the core module, function modules, and a rule file defining packaging conditions for the function modules; a receiving unit for receiving, from the client device, a request specifying function modules; a determining unit for determining function modules to be included in the driver package from the stored function modules, based on the specified function modules and the rule file; a creating unit for creating an install scenario that specifies a method for installing the function modules when the driver package is installed in the client device, wherein the install scenario is created based on the determined function modules and the rule file; and a package generating unit for generating the driver package including the core module, the determined function modules, and the created install scenario.

8 Claims, 15 Drawing Sheets

(56) References Cited

U.S. PATENT DOCUMENTS

| | | | |
|---|---|---|---|
| 7,802,246 B1* | 9/2010 | Kennedy et al. | 717/173 |
| 8,074,214 B2* | 12/2011 | Isaacson et al. | 717/173 |
| 8,352,935 B2* | 1/2013 | Isaacson et al. | 717/173 |
| 8,395,787 B2* | 3/2013 | Shintoku | 358/1.13 |
| 2003/0037327 A1* | 2/2003 | Cicciarelli et al. | 717/178 |
| 2003/0195951 A1* | 10/2003 | Wittel et al. | 709/220 |
| 2003/0197727 A1* | 10/2003 | Milius | 345/744 |
| 2004/0223182 A1 | 11/2004 | Minagawa | |
| 2006/0123414 A1* | 6/2006 | Fors et al. | 717/177 |
| 2006/0176499 A1* | 8/2006 | Shintoku | 358/1.13 |
| 2006/0265702 A1* | 11/2006 | Isaacson et al. | 717/168 |
| 2006/0265706 A1* | 11/2006 | Isaacson et al. | 717/174 |
| 2006/0277542 A1* | 12/2006 | Wipfel | 717/174 |
| 2007/0028229 A1* | 2/2007 | Knatcher | 717/174 |
| 2007/0094400 A1 | 4/2007 | Childress et al. | |
| 2008/0059953 A1* | 3/2008 | Savva | 717/121 |
| 2008/0244566 A1 | 10/2008 | Fukaya | |

* cited by examiner

Fig. 1

| Description | Version | Update | File size | Download |
|---|---|---|---|---|
| PCL6 DRIVER(STANDARD VERSION) | Ver.3.2.0.0 | 05/08/2008 | 2,245KB | ⤓ |
| PCL6 DRIVER(LIGHTWEIGHT VERSION) | Ver.3.2.0.0 | 05/08/2008 | 1,249KB | ⤓ |
| PCL6 DRIVER (ENTERPRISE VERSION) New! | Ver.1.3.0.0 | 11/02/2008 | 3,132KB | ⤓ |
| PCL6 DRIVER(ECO-FRIENDLY VERSION) | Ver.3.1.0 | 06/24/2008 | 4,976KB | ⤓ |

PRINTER DRIVER DOWNLOAD

Home | Products | Solutions | Contact | Environment | Site Map | Downloads | About us
Search:

Downloads

Download
Manuals

Fig. 8

(RULE FOR FUNCTION A)
Any_Core, Must

PCL5_Core, IF_Opt, -pcl5

PCL6_Core, IF_Opt, -pcl6

FuncC, Not (RULE FOR FUNCTION B)
Any_Core, Must

FuncD, Want

FuncD, IF_Opt, -Half (RULE FOR FUNCTION C)
PS_Core, Must

FuncA, Not (RULE FOR FUNCTION D)
Any_Core, Must

```
[Driver File1]
Path = .¥Core¥Install.exe

[Driver File2]
Path = .¥FuncA¥Install.exe -pcl6

[Driver File3]
Path = .¥FuncB¥Install.exe
```

Fig. 14

[Driver File1]
Path = .¥Core¥Install.exe

[Driver File2]
Path = .¥FuncA¥Install.exe -pcl6

[Driver File3]
Path = .¥FuncB¥Install.exe

[Driver File4]
Path = .¥FuncD¥Install.exe -Half

SERVER DEVICE AND COMPUTER-READABLE RECORDING MEDIUM FOR GENERATING A DRIVER PACKAGE

TECHNICAL FIELD

The present invention relates to a server device and a computer-readable recording medium in which a driver package generating program is stored for generating a driver package.

BACKGROUND ART

A printer driver is a program that is installed in, for example, a user terminal, for giving printing instructions including various printing settings to a printer. Generally a printer driver is available on the Internet, and a user can download a printer driver corresponding to the machine type of the printer. FIG. 1 illustrates an example of a printer driver download page.

The printer driver download page may provide plural types of printer drivers for one machine type. For example, as shown in FIG. 1, different printer driver packages are provided according to the included functions, such as a standard (recommended) version, a lightweight version, and an enterprise version. Furthermore, each user can select the functions to be downloaded by selecting which function is required and which function is not required (optional function).

FIG. 2 illustrates an example of an internal data configuration of a printer driver download page. The printer driver download page and the driver packages (entities) on the server are linked to each other, and the driver packages corresponding to the download page can be downloaded from the server.

FIG. 3 schematically illustrates examples of files that are packaged in the driver packages. Different files (modules) are included according to the package. A driver installer is created for installing a driver core and various functions included in the package. A driver core must be included in every package, because the driver core is for providing essential functions of the printer driver. Functions A, B, and C are not necessarily essential functions, and may thus be selected according to purposes and requirements of the user.

As described above, a driver package includes multiple files, and each file is provided according to the function and task. A package does not need to include all of the files under regular conditions, unless the user wants to use all of the functions. Conventionally, a package is provided with files that are assumed to be typically used by users.

This is because it would be unrealistic to provide packages corresponding to all of the combinations of functions, as costs would increase significantly. For example, in the above case, a total of 16 types of packages would need to be created by the provider (for example, the manufacturer), in order to provide all combinations of functions A, B, and C, in addition to the essential driver core. Therefore, a conventional package is provided with a reasonable number of files.

However, when all of the files (or many files) are packaged in the driver package, the package size increases significantly. Some users may not need all of the functions, in which case the package size would be needlessly large. Furthermore, complicated operations may be required to use the driver package because of the unnecessary functions for some users, thereby reducing user-friendliness. Nevertheless, as described above, it would be unrealistic to provide packages corresponding to all of the combinations of functions, because costs would increase significantly.

Patent document 1 describes a pertinent technology. Specifically, when downloading a package file of a driver, the package file is generated in accordance with the client device. Therefore, even if client devices are provided in a wide variety of environments, submodules can be appropriately added or changed, so that an appropriate package file of a device driver can be easily prepared and provided. That is, when a printer driver is downloaded, the server device selects functions that are required by the user, to generate a package file in which only necessary functions are packaged.

A printer is often provided with many additional options (functions). The basic function of a printer is a printing function. However, in recent years and continuing, technologies related to an MFP (Multi-Function Peripheral) are advancing, such as improved CPU performance, increased memory capacity, increased communications speed, and enhanced digital imaging technologies. Thus, an MFP may not only provide a printing function, but may also provide a variety of functions, thereby providing versatile usage formats in user environments. Accordingly, the corresponding printer driver would need to accommodate a large number of functions. Therefore, it would be unrealistic to provide packages corresponding to all of the combinations of functions.

Furthermore, in the invention of patent document 1, when performing the operation of selecting the functions required by the user and generating (providing) a package file packaging only the necessary functions, it is not good enough to merely package the necessary functions to generate the package file. In a printer having multiple functions, there may be option functions that are in an exclusive relationship or in a subordinate-superior relationship. The functions are to be combined in consideration of such mutual relationships between the functions according to the function properties. For example, if two functions having an exclusive relationship are included in the package, one of the packages is not actually used, and therefore a redundant function would be included in the package. In another example, when there are two functions having a subordinate-superior relationship, but only the subordinate function is included in the package, the subordinate function cannot be actually used because the superior function is missing, and therefore a useless function would be included in the package.

One approach is to create packages corresponding to all of the combinations of functions in consideration of these mutual relationships between the functions; however, this is unrealistic because costs would increase significantly.

Patent Document 1: Japanese Laid-Open Patent Application No. 2006-244009

Accordingly, there is a need for a server device and a computer-readable recording medium in which a driver package generating program is stored for generating a driver package that can be easily provided by the provider, whereby the driver package is generated such that only function modules required by the user are packaged and unnecessary functions are not packaged.

DISCLOSURE OF INVENTION

Aspects of the present invention provide a server device and a computer-readable recording medium in which a driver package generating program is stored that solve or reduce one or more problems caused by the limitations and disadvantages of the related art.

An aspect of the present invention provides a server device for providing a client device with a driver package including at least a core module of a driver, the server device including a storage unit configured to store the core module, a group of function modules, and a rule file defining packaging conditions for the function modules included in the group of function modules, wherein the core module and the group of function modules are used as components of the driver package; a receiving unit configured to receive, from the client device, a driver package request specifying one or more of the function modules; a determining unit configured to determine one or more of the function modules to be included in the driver package from the group of function modules, based on the one or more of the function modules specified in the driver package request and the rule file; an install scenario creating unit configured to create an install scenario that specifies an installing method for installing the function modules included in the driver package when the driver package is installed in the client device, wherein the install scenario is created based on the one or more of the function modules determined to be included in the driver package by the determining unit and the rule file; and a package generating unit configured to generate the driver package including the core module, the one or more of the function modules determined to be included in the driver package by the determining unit, and the install scenario created by the install scenario creating unit.

An aspect of the present invention provides a computer-readable recording medium that stores therein a driver package generating program that causes a server device to execute a procedure for providing a client device with a driver package including at least a core module of a driver, the procedure including a storage step of storing the core module, a group of function modules, and a rule file defining packaging conditions for the function modules included in the group of function modules, wherein the core module and the group of function modules are used as components of the driver package; a receiving step of receiving, from the client device, a driver package request specifying one or more of the function modules; a determining step of determining one or more of the function modules to be included in the driver package from the group of function modules, based on the one or more of the function modules specified in the driver package request and the rule file; an install scenario creating step of creating an install scenario that specifies an installing method for installing the function modules included in the driver package when the driver package is installed in the client device, wherein the install scenario is created based on the one or more of the function modules determined to be included in the driver package at the determining step and the rule file; and a package generating step of generating the driver package including the core module, the one or more of the function modules determined to be included in the driver package at the determining step, and the install scenario created at the install scenario creating step.

BRIEF DESCRIPTION OF DRAWINGS

FIG. 1 illustrates an example of a printer driver download page;

FIG. 8 illustrates an example of the contents described in a rule file;

FIG. 11 illustrates an example of an install scenario;

FIG. 14 illustrates an install scenario; and

BEST MODE FOR CARRYING OUT THE INVENTION

Embodiments of the present invention are described below with reference to the accompanying drawings.

<Configuration>

Figure 2:
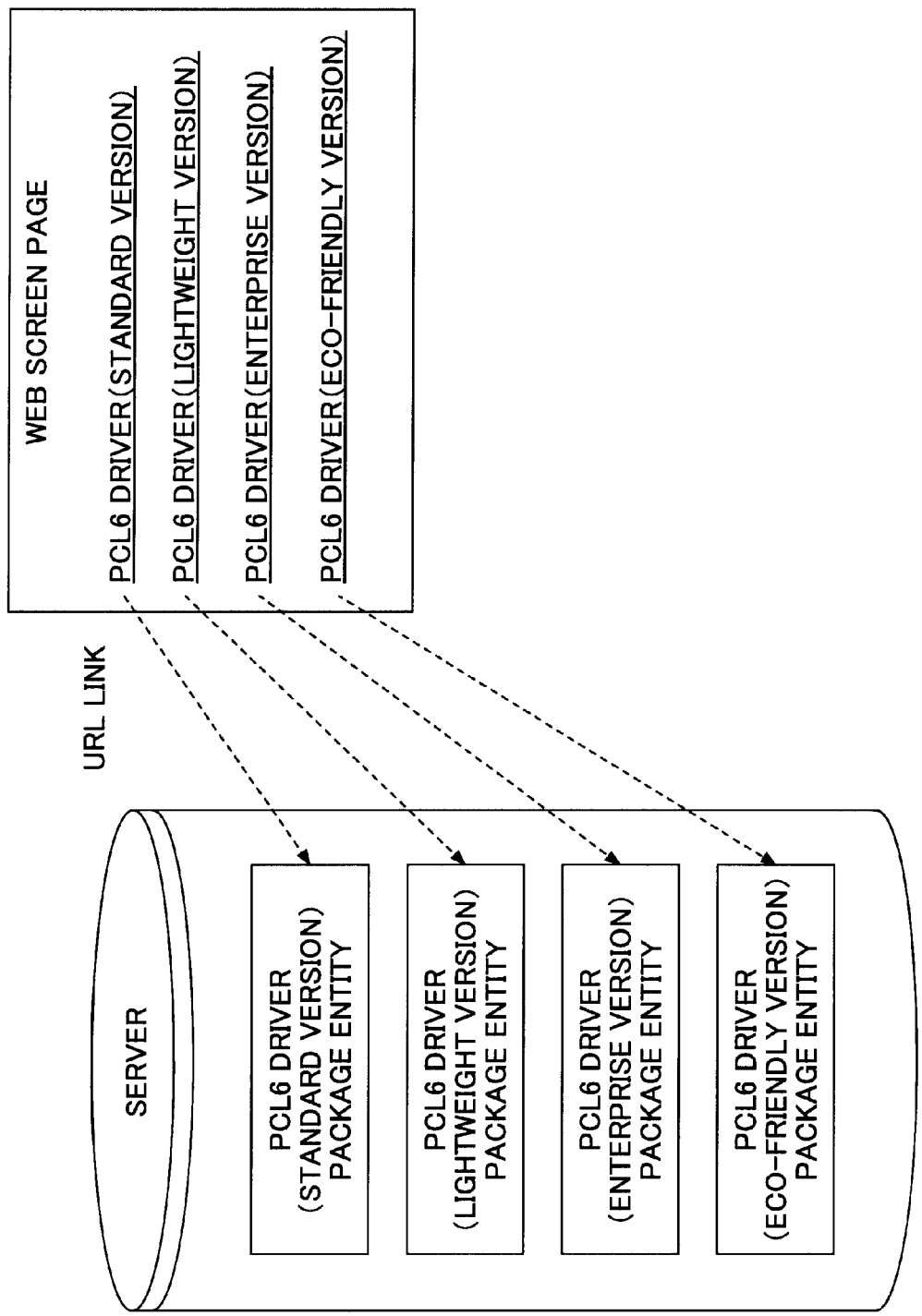
FIG. 2 illustrates an example of an internal data configuration of a printer driver download page.
Figure 3:
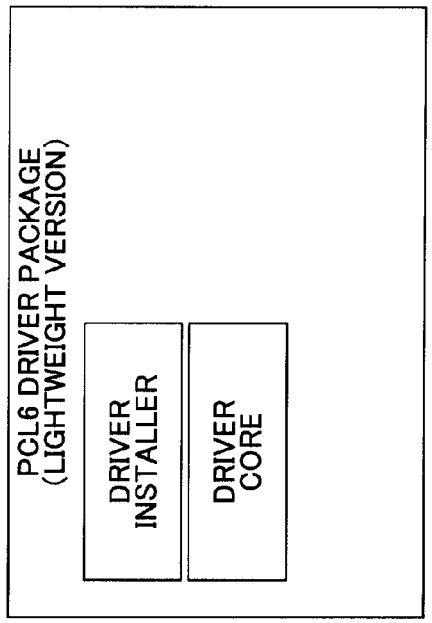
FIG. 3 schematically illustrates examples of files that are packaged in the driver packages.
Figure 3:
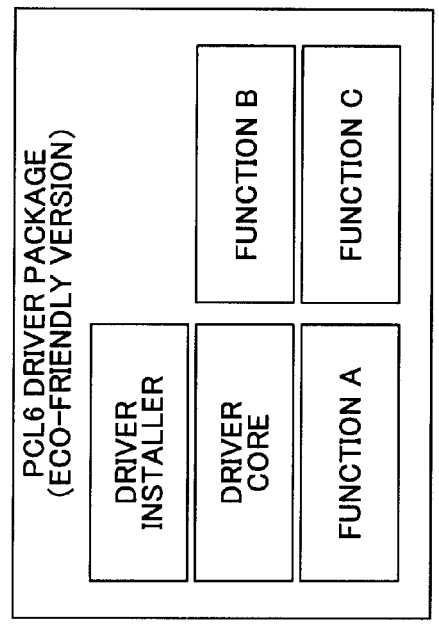
Figure 3:
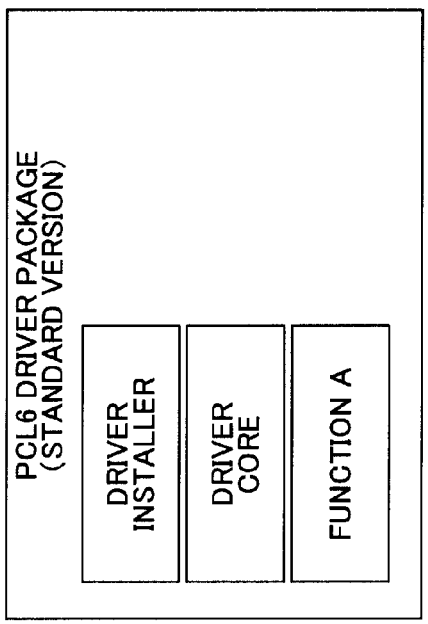
Figure 3:
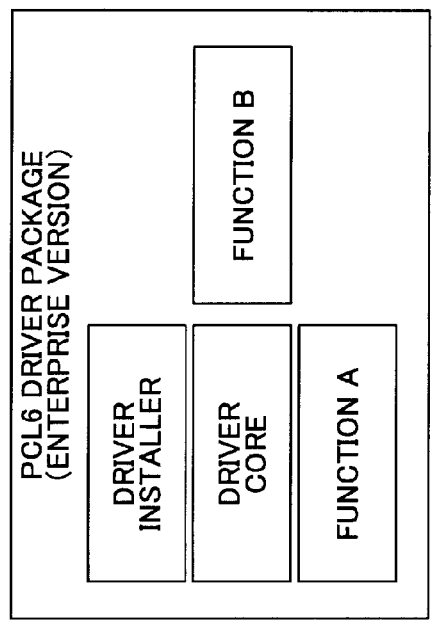
Figure 4:
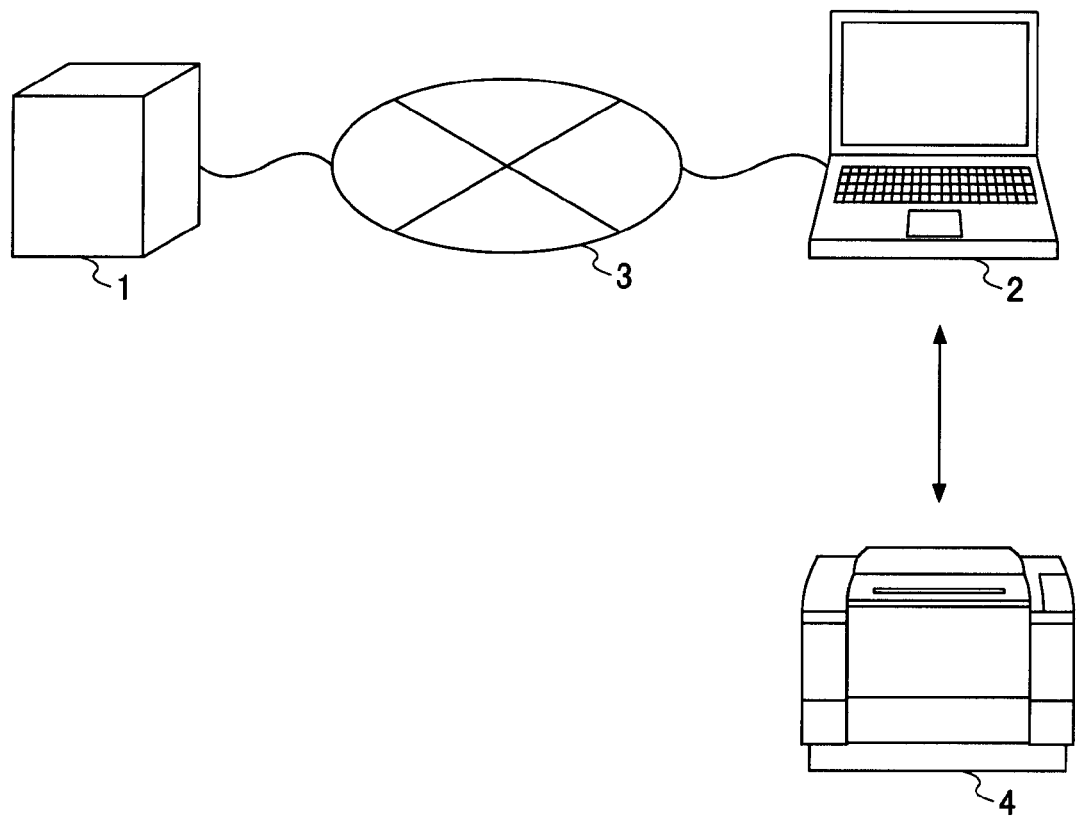
FIG. 4 illustrates a network configuration according to an embodiment of the present invention.

First, before describing details of the present invention, a description is given of a system configuration for implementing an embodiment of the present invention. FIG. 4 illustrates a network configuration according to an embodiment of the present invention. A server 1 and a client PC (hereinafter, "PC") 2 according to an embodiment of the present invention are connected via a network 3 such as the Internet. The server 1 is a server device for providing a printer driver package to the PC 1. Furthermore, the server 1 has a Web function to facilitate access from the PC 1 with the use of Web technology.

The PC 1 is a user terminal, and downloads the necessary printer driver from the server 1 via a Web browser. The printer driver package is installed in the PC 1, and gives printing instructions to a printer 4. The printer 4 is a printer device such as an image forming apparatus, which receives the printing instructions from the printer driver of the PC 1 and executes the printing instruction.

The server 1 has a storage unit (e.g., a database) as described below. However, the function of the storage unit does not need to be in the same casing as the server 1. The function of the storage unit may be provided in a file server connected to the network 3.

(Server)

Figure 5:
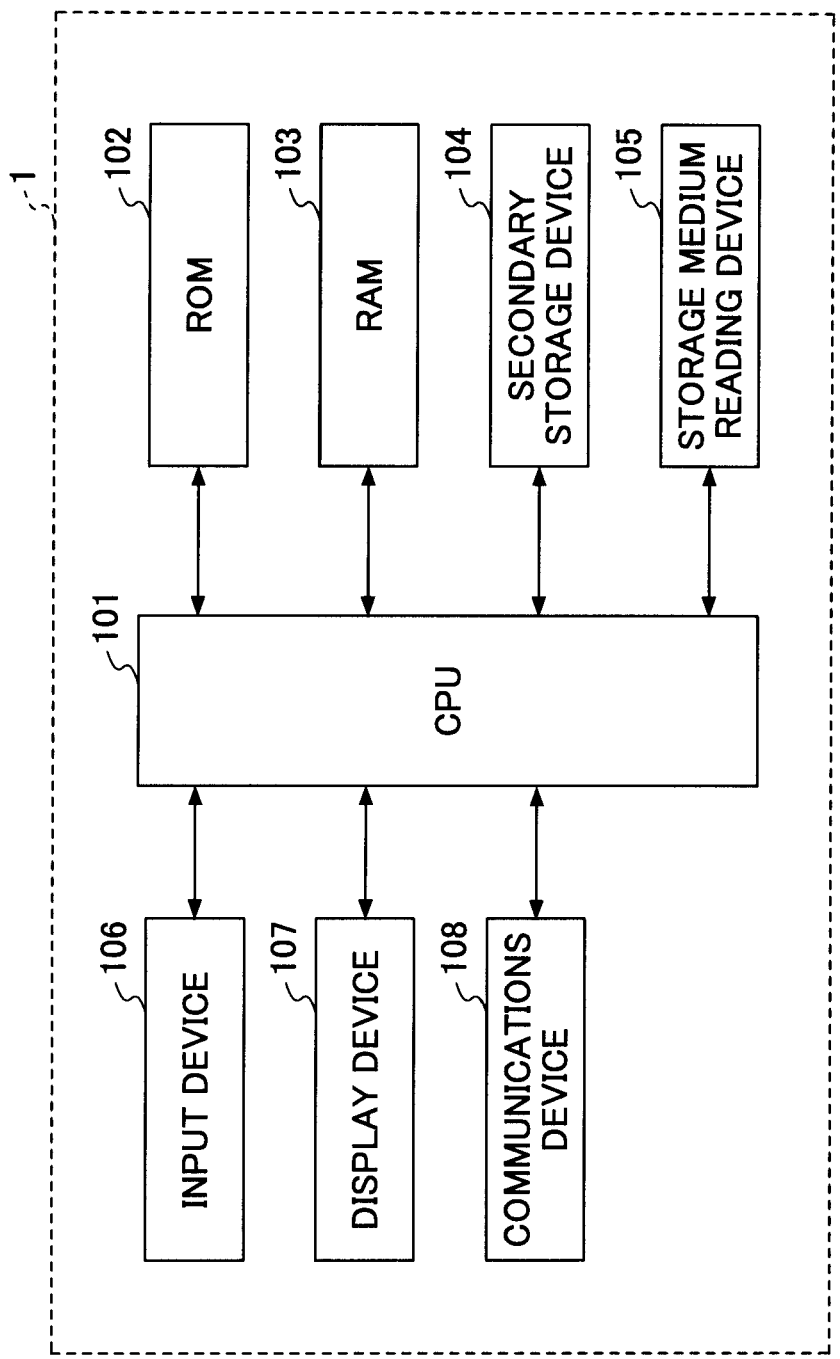
FIG. 5 illustrates a main hardware configuration of a server according to an embodiment of the present invention.

FIG. 5 illustrates a main hardware configuration of the server 1 according to an embodiment of the present invention. A brief description is given of the hardware configuration of the server 1. The server 1 may be a typical information processing device, including a CPU 101, a ROM (Read Only Memory) 102, a RAM (Random Access Memory) 103, a secondary storage device 104, a storage medium reading device 105, an input device 106, a display device 107, and a communications device 108.

The CPU 101 includes a microprocessor and peripheral circuits, and controls the entire PC 1. The ROM 102 is a memory for storing predetermined control programs (software components) executed by the CPU 101. The RAM 103 is used as a work area when the CPU 101 executes the predetermined control programs (software components) stored in the ROM 102 to implement various control operations.

The secondary storage device 104 is, for example, a HDD (Hard Disk Drive) that is a nonvolatile storage device, for storing various information items including a general-purpose OS (Operating System) and a printer driver. The above-described information items may be stored not only in the secondary storage device 104 but also in a storage medium such as a CD-ROM (Compact Disk-ROM) and a DVD (Digital Versatile Disk). The various information items stored in such a storage medium may be read via a drive device such as the storage medium reading device 105.

The input device 106 is used by the server administrator to perform various input operations. The input device 106 includes a mouse and a keyboard. The display device 107 is a so-called display screen which may be a LCD (Liquid Crystal Display) or a CRT (Cathode Ray Tube). The communications device 108 is for performing communications with the PC 2 via the network 3, and supports communications according to various network formats including a wired network and a wireless network.

Figure 6:
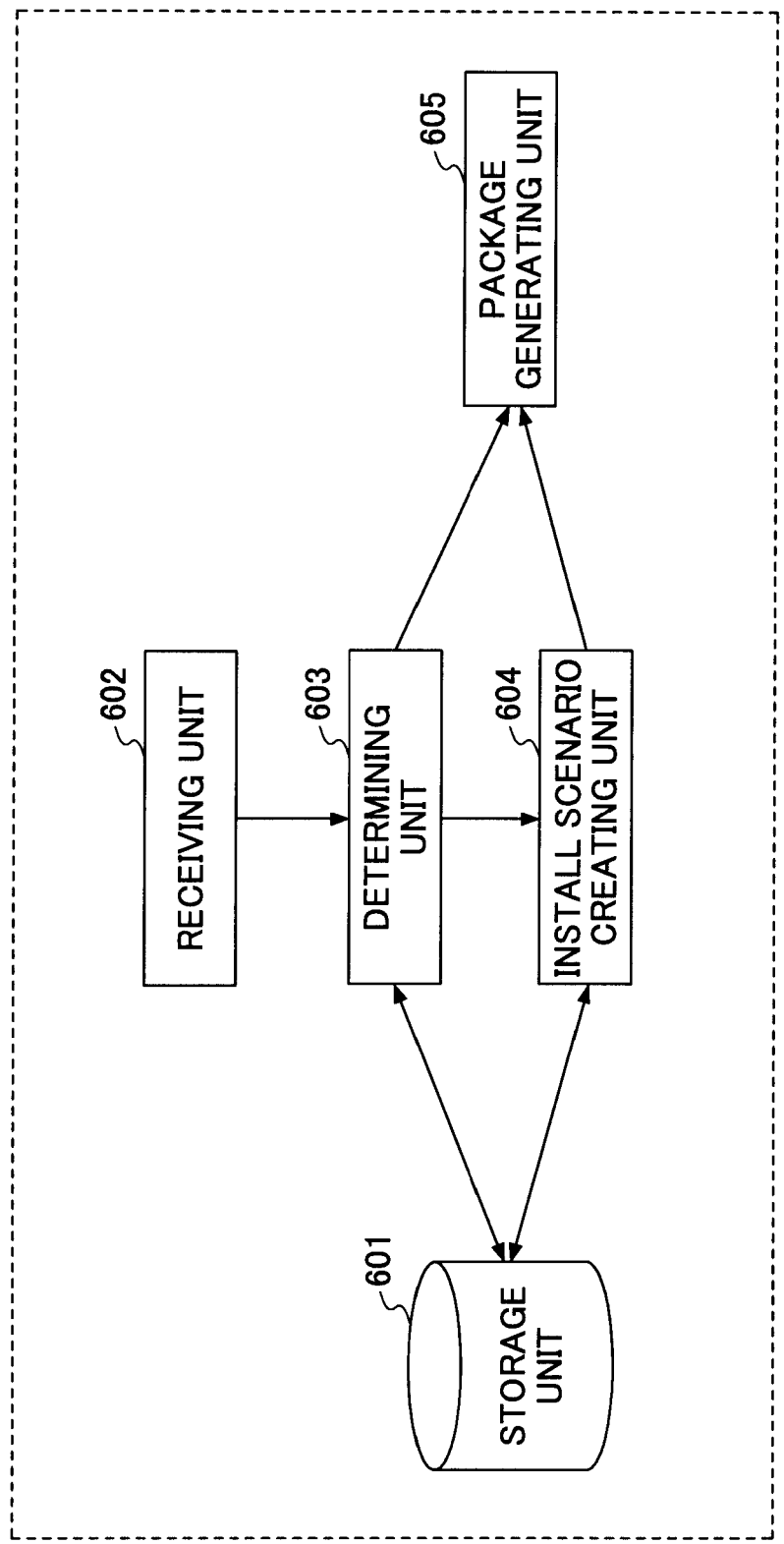
FIG. 6 is a functional block diagram of the main functions of the server according to an embodiment of the present invention.

FIG. 6 is a functional block diagram of the main functions of the server 1 according to an embodiment of the present invention. The main function units are a storage unit 601, a receiving unit 602, a determining unit 603, an install scenario creating unit 604, and a package generating unit 605. A brief description is given herein, and further details of functional operations of the function units are described below.

The storage unit 601 includes a core module and a group of function modules that are used as components of the driver package, as well as a rule file defining packaging conditions for the function modules. The data stored in the storage unit 601 is described below.

The receiving unit 602 is for receiving, from the PC 2, a driver package request specifying a function module. The driver package request includes information indicating the function that the user wants to include in the driver package, (functions that the user wants to use with the printer 4 by means of the driver), such as a function A and a function B.

The determining unit 603 is for determining the function module to be included in the driver package among the group of function modules in the storage unit 601, based on the function module specified by the user and the rule file in the storage unit 601.

The install scenario creating unit 604 is for creating an install scenario for specifying the method of installing the modules when the driver package is installed in the PC 2. The install scenario is created based on the function module determined at the determining unit 603 and the rule file in the storage unit 601.

The package generating unit 605 is for generating a driver package including the core module, the determined function module, and the created install scenario. The core module is an essential module that must be included in every printer driver. The driver package also includes a master installer, which is described below.

The above-described functions are actually implemented by a computer (server 1) according to a driver package generating program executed by the CPU 101. The driver package generating program may be stored in a computer-readable recording medium for causing the computer (server 1) to execute a procedure of the driver package generating program.

(Data Configuration)

Figure 7:
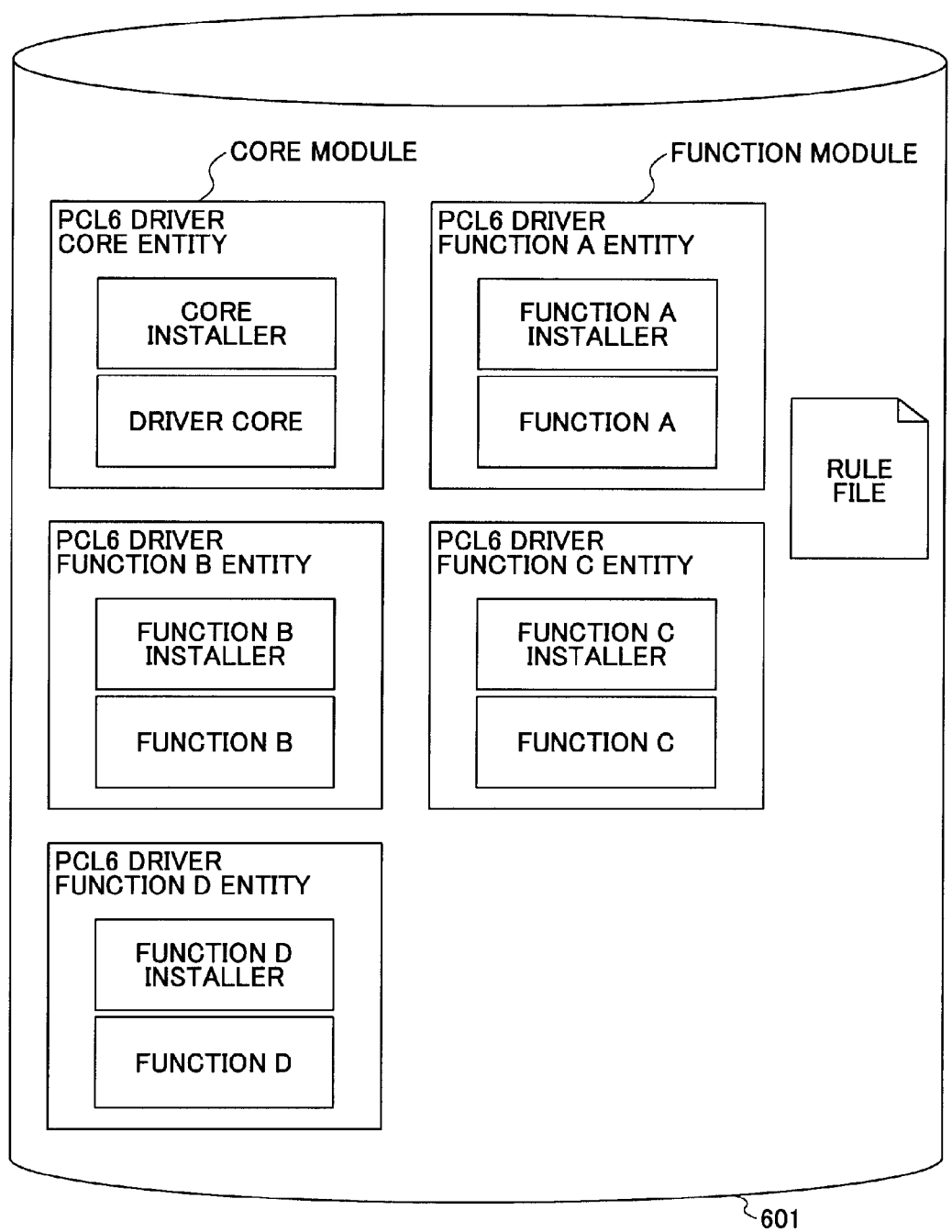
FIG. 7 schematically illustrates a configuration of stored data.

A description is given of a configuration of the data stored in the storage unit 601. FIG. 7 schematically illustrates a configuration of the stored data. As described above, the storage unit 601 stores a core module, a group of function modules, and a rule file.

The core module and each of the function modules have corresponding installers, as shown in FIG. 7. The module entities are data items that are independent from each other.

The essential core module and the required function modules are packaged in the driver package. When the driver package is installed in the PC 2, the driver package is first opened. In accordance with the procedures specified in the install scenario, the respective modules are installed. Each module is installed by its own installer.

The rule file defines the packaging conditions of the function modules. The rule file is released at the same time as the modules (components) of the driver. For example, the rule file defines exclusive relationships between the function modules, and the determining unit 603 determines the function modules to be included in the driver package among the group of function modules, based on the user-specified function modules and the exclusive relationships defined by the rule file. That is, when mutually exclusive function modules are included among the function modules specified by the user, one of the functions included in the exclusive relationship is not included in the package. Furthermore, the rule file defines the order of installing the function modules, as well as install attributes. The install scenario creating unit 604 creates an install scenario specifying the install order and the install attributes to be applied when installing the function modules determined by the determining unit 603 in the PC 2. Specifically, an appropriate install scenario is created by referring to the rule file.

FIG. 8 illustrates an example of the contents described in the rule file. For example, in the rule file, property conditions for the functions are listed in a CSV format. For example, in FIG. 8, the "rule for function A" defines "Any_Core, Must". "Any_Core, Must" means that "function A must include one of the core modules".

Furthermore, "PCL5_Core, IF_Opt, -pcl5" means that "when function A is installed together with the core module of PCL5, the option -pcl5 is specified". Specifically, function A includes a Locked Print function for each PDL, and can thus accommodate any core module. However, when the core module is PCL5, it is specified that function A is to be installed as a function for PCL5. Thus, an install option is specified for the installer of function A.

Next, the "rule for function B" defines "FuncD, Want", which means that "function (module) D is recommended for function B". Function D is an extended function of function B, and therefore a higher function can be provided by adding function D. Obviously, function D can only be added after function B has been added. For example, when function B is a basic tint block function and function D is an extended tint block function, the PC 2 needs to have the basic tint block function installed as the base function, in order to install and use the extended tint block function in the PC 2. This is because the extended function uses various process units of the basic function. In another example, when function B is a watermark function and function D is a (basic) tint block function, and the tint block function is installed alone, only a simplified version of the tint block function can be used. However, if the tint block function is added after the watermark function is installed, a higher version of the tint block function can be used. With such a higher version, the watermark function can also be fully implemented.

Furthermore, the "rule for function C" defines "FuncA, Not", which means that "function C excludes function (module) A". That is, function C and function A have a mutually exclusive relationship in terms of their functions and configurations, and thus cannot be simply installed together. For example, function C may be a function for a PS Driver (for example, a PS Passthrough function), which cannot be added to the core of a PCL6 Driver. Next, a description is given of the processing operations of the server 1 by specifically applying the above-described rules.

<Operation>

Figure 9:
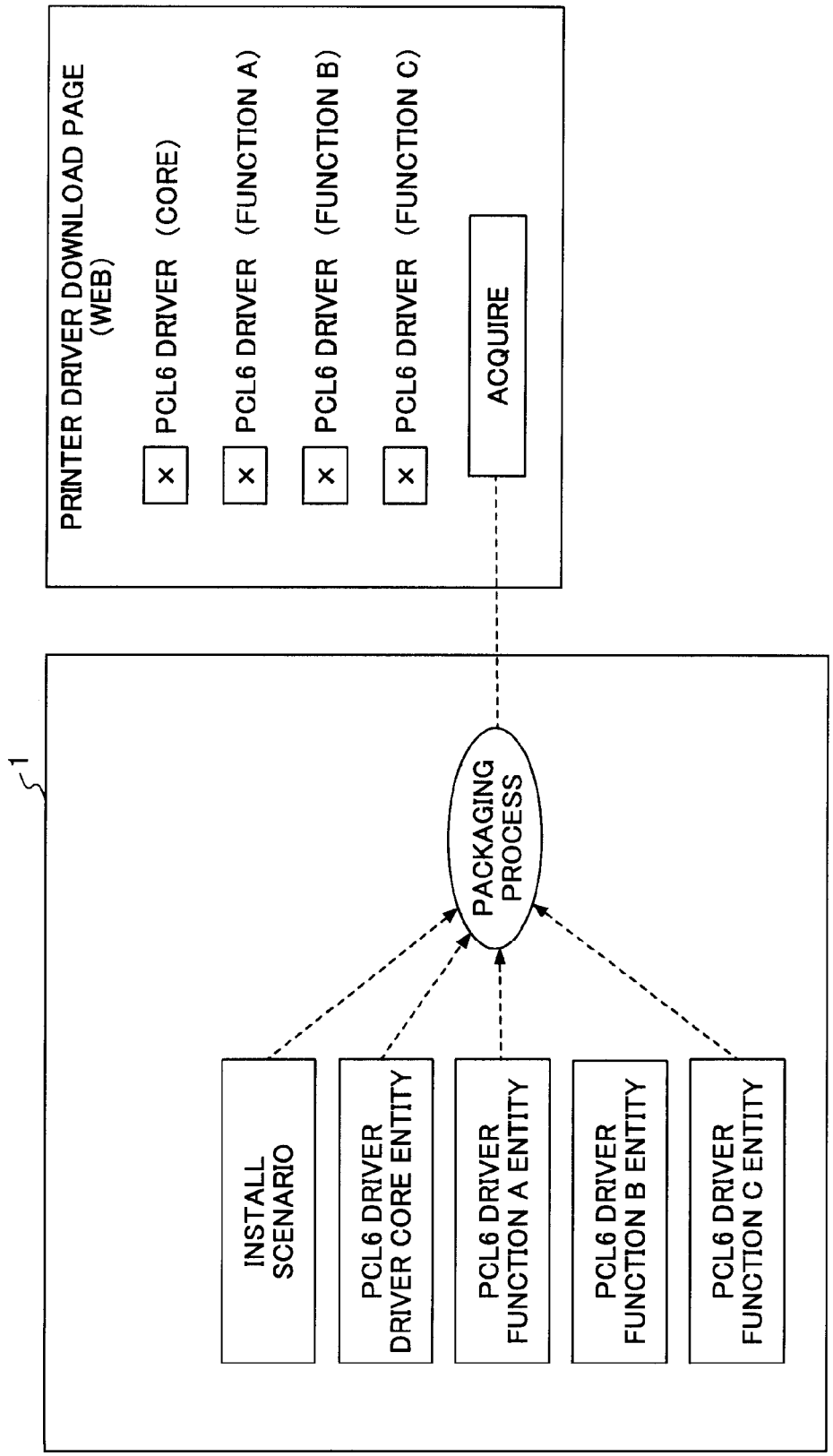
FIG. 9 illustrates a concept of acquiring a driver package from the server.

FIG. 9 illustrates a concept of acquiring a driver package from the server 1. When the user specifies (selects) necessary functions from a printer driver download page (Web screen page, etc.), the server 1 dynamically acquires the specified functions (modules), performs a packaging process to generate a driver package, and provides the generated driver package to the user. The "PCL6 Driver (core)" is an essential module, and therefore there may be a default setting such that the "PCL6 Driver (core)" is mandatorily specified.

Figure 10:
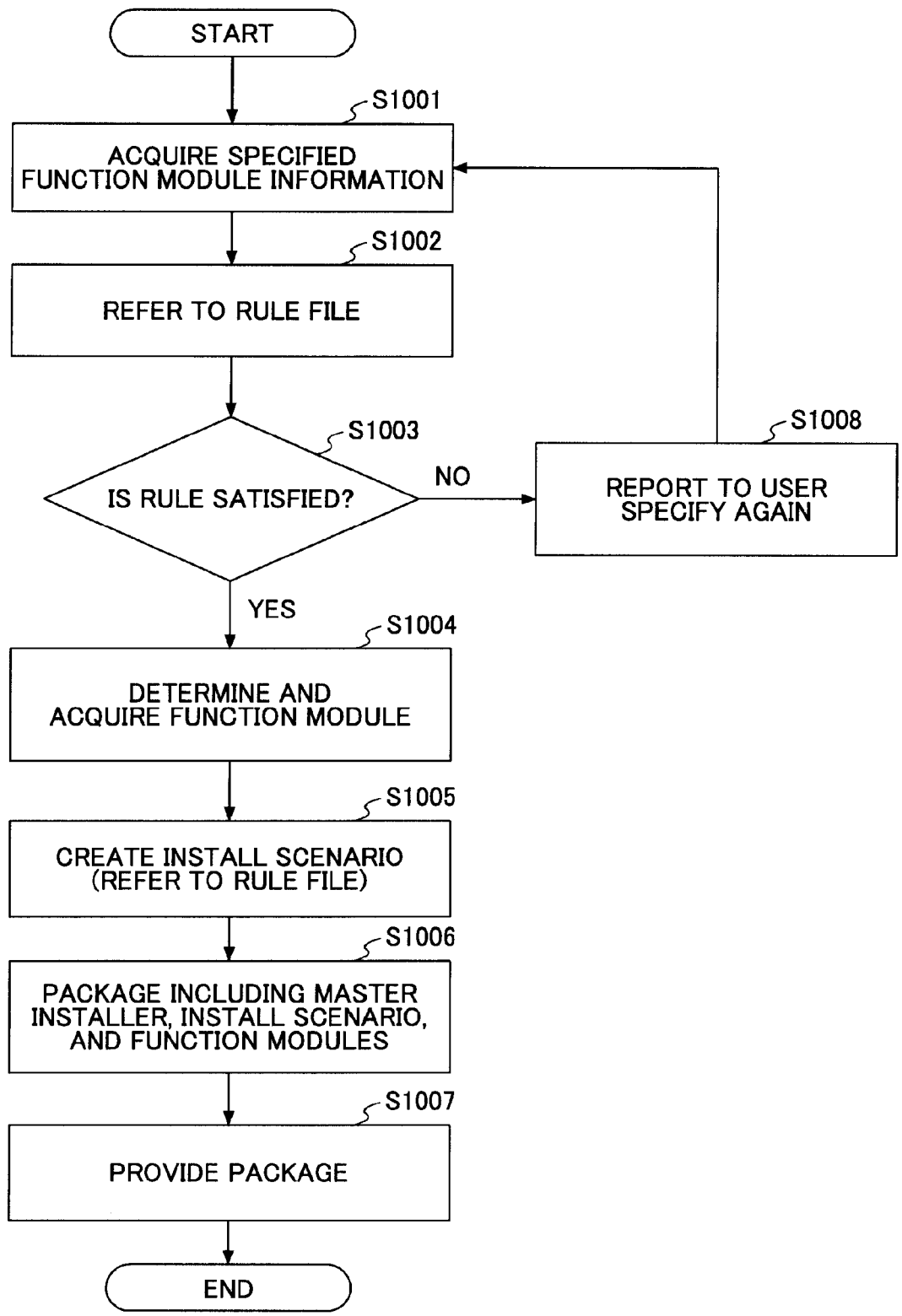
FIG. 10 is a flowchart for describing a processing operation of the server.

FIG. 10 is a flowchart for describing the processing operation of the server 1. Specifically, FIG. 10 is for describing the driver package generating process.

In step S1001, when a driver package request specifying function modules is received from the PC 2, the receiving unit 602 acquires the specified function module information. It is assumed that the specified function modules are "PCL6 Driver (core)", "PCL6 Driver (function A)", "PCL6 Driver (function B)", and "PCL6 Driver (function C)", so as to correspond to FIG. 9.

In step S1002, the determining unit 603 refers to the rule file to determine whether the specified function modules have an exclusive relationship.

In step S1003, the determining unit 603 determines whether the rules are satisfied. When the specified function modules do not have an exclusive relationship, the process proceeds to step S1004, where the determining unit 603 determines that the specified function modules are to be included in the driver package, and acquires the specified function modules (entities) from the storage unit 601.

When the specified function modules have an exclusive relationship, in step S1008, a pertinent report is sent to the user, and a screen page prompting the user to make another setting is displayed. The screen page preferably prompts the user to make a specification (selection) that satisfies the rules, by notifying the user which specific function cannot be incorporated in the driver package.

In this example, the specified function modules are "PCL6 Driver (core)", "PCL6 Driver (function A)", "PCL6 Driver (function B)", and "PCL6 Driver (function C)", as described above. Referring to the rule file shown in FIG. 8, the function modules "PCL6 Driver (function A)" and "PCL6 Driver (function C)" have an exclusive relationship, and therefore the process proceeds to step S1008. Then, a report is sent to the user, saying that "PCL6 Driver (function C)" cannot be specified. Then, it is assumed that the user specifies "PCL6 Driver (core)", "PCL6 Driver (function A)", and "PCL6 Driver (function B)" in a new setting. Other than reporting an exclusive relationship, the report to the user may also indicate that "PCL6 Driver (function D)" is recommended for "PCL6 Driver (function B)", to prompt the user to make another setting for including "PCL6 Driver (function D)".

In step S1005, the install scenario creating unit 604 refers to the rule file once again, and creates an install scenario specifying the method for installing the determined function modules. FIG. 11 illustrates an example of an install scenario. The install scenario schematically defines the order of installing the modules. More details of the install scenario are described below. The description of the processing operation is continued.

In step S1006, the package generating unit 605 generates a driver package including the core module, the determined function modules, and the created install scenario. The package generating unit 605 includes the master installer in the driver package, and then packages the function modules (compresses the function modules to convert them into a single file). The master installer is for the whole driver package. Actually, the master installer is for activating the installers included in each of the modules, in the order defined (described) in the install scenario.

Figure 12:
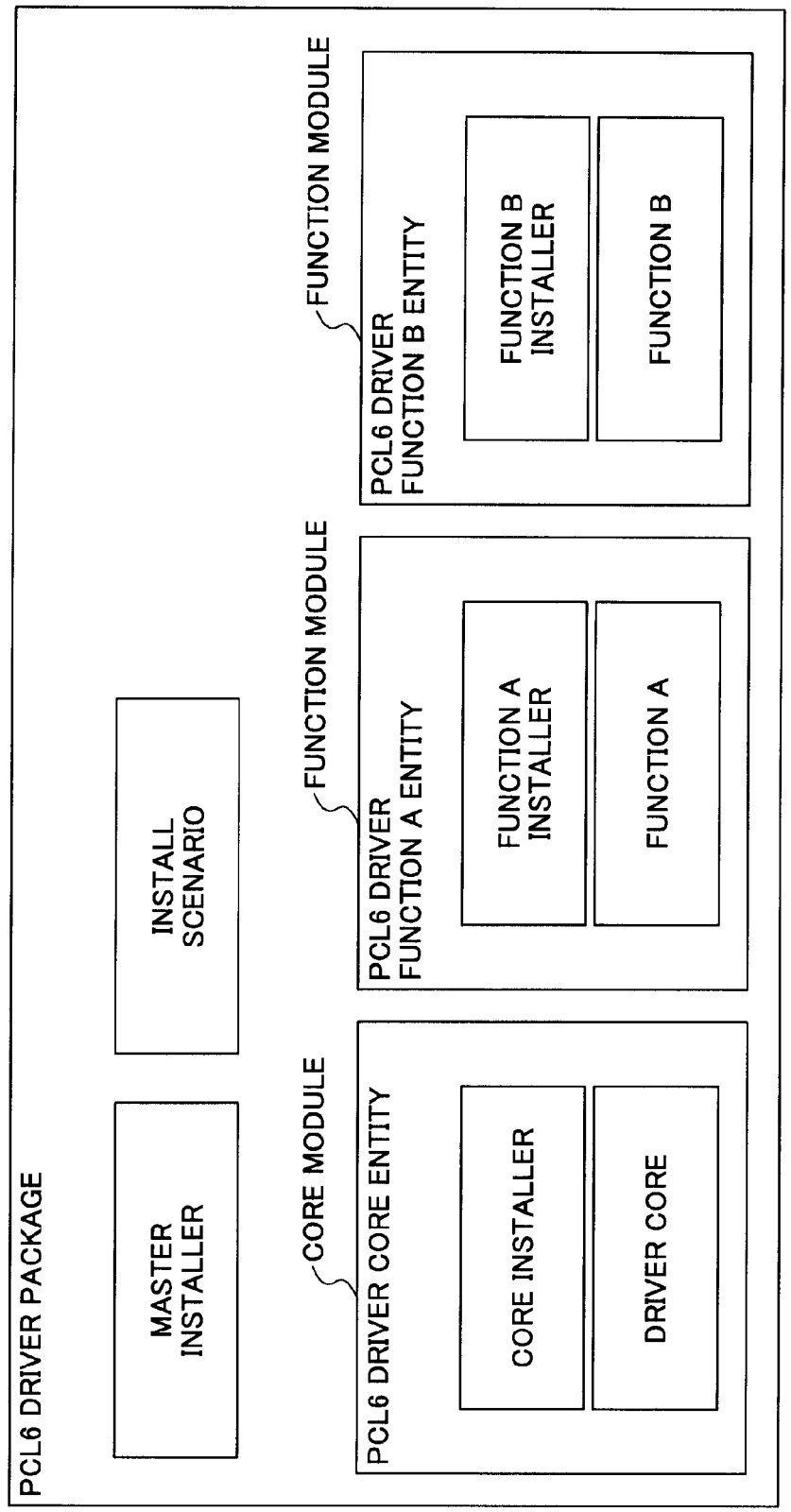
FIG. 12 illustrates an example of data included in a driver package.

FIG. 12 illustrates an example of data included in a driver package. A driver package, which has been dynamically generated according to a user specification, includes a master installer, an install scenario, a "PCL6 Driver core entity", a "PCL6 Driver function A entity", and a "PCL6 Driver function B entity".

In step S1007, the server 1 provides the generated driver package to the PC 2.

(Installing Process)

The driver package that has been downloaded to the PC 2 is installed in the PC 2 as a printer driver before being used. A description is given of a flow of installing the driver package in the PC 2, in order to describe the master installer and the install scenario in more detail.

Figure 13:
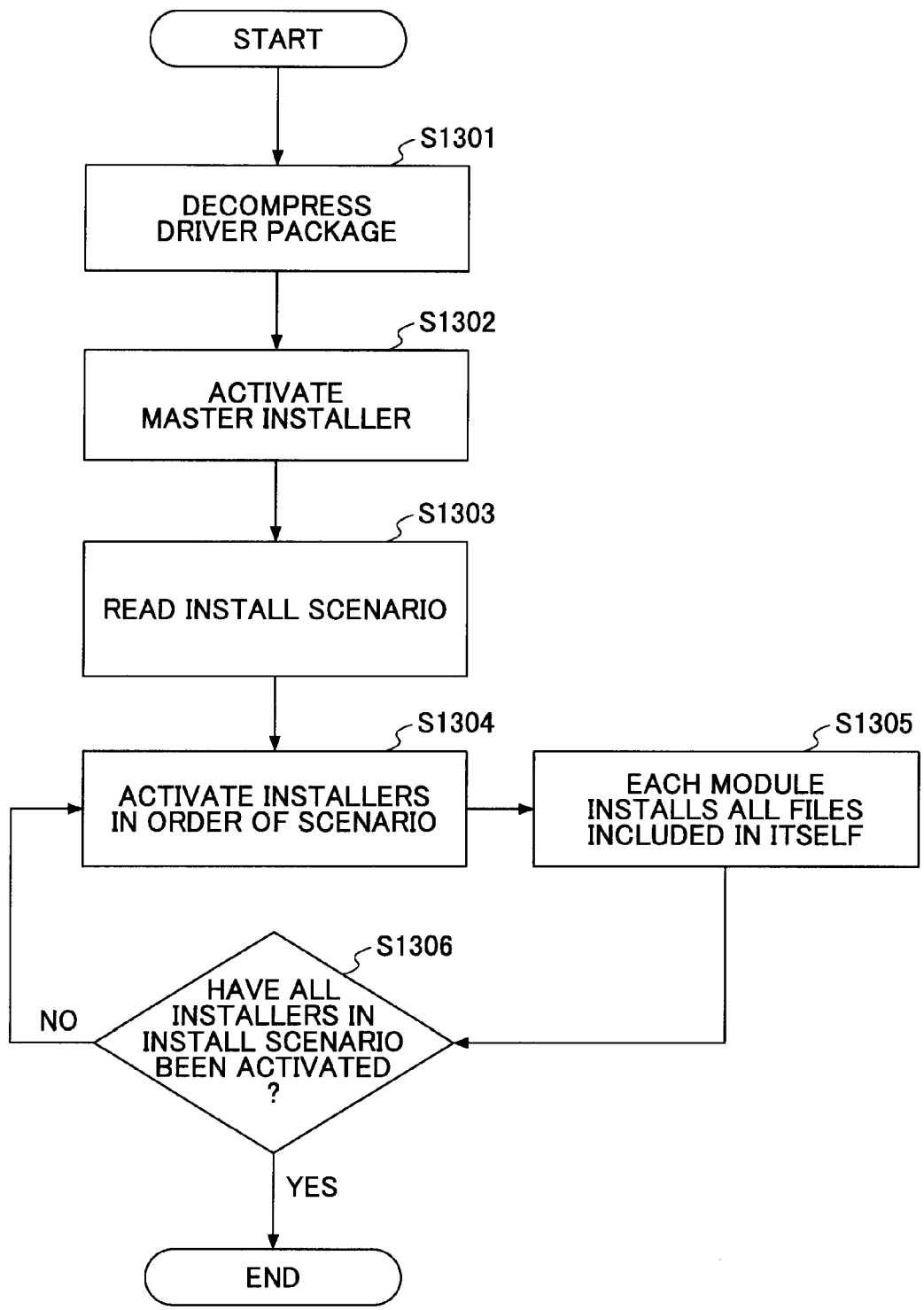
FIG. 13 is a flowchart for describing the process of installing a driver package.

FIG. 13 is a flowchart for describing the process of installing a driver package. The driver package generated at the server 1 is downloaded to the PC 2. The driver package is installed in the PC 2 so that the driver package can be used.

In step S1301, the PC 2 decompresses the driver package, because the driver package had been compressed at the server 1.

In step S1302, the master installer is activated. The master installer is for the whole driver package.

In step S1303, the master installer reads (refers to) the install scenario. The master installer activates the installers included in each of the modules, in the order that is defined (described) in the install scenario.

In step S1304, the installers are activated in the order defined in the install scenario. Referring back to FIG. 11, ".\Core\Install.exe" is described as [Driver File1]. Thus, the master installer activates ".\Core\Install.exe", which is the installer program. The ".\Core\Install.exe" corresponds to the "core installer" in the "PCL6 Driver core entity", with reference to FIG. 12.

In step S1305, each module installs all of the files included in itself. That is, each module has its own installer, so when the installer is activated, all of the files included in the module can be installed. Referring back to FIG. 11, when the "core installer" in the "PCL6 Driver core entity" is activated, the "driver core" is installed. As described above, the master installer simply activates the installers of the modules in the defined order, and then the installers perform the installing process for the corresponding modules.

In step S1306, the server 1 determines whether all of the installers in the install scenario have been activated. When all of the installers have been activated, it means that all of the modules (core driver, function drivers) have been installed, and therefore the installing process ends. When all of the installers have not been activated, the same process as described above is performed until all of the installers have been activated in order. Specifically, the master installer activates the installers in the order of ".\Core\Install.exe", ".\FuncA \Install.exe", and "\FuncB \Install.exe".

(Supplementary Description)

The above describes the process of generating a driver package performed by the server 1. A supplementary description is given for cases that have not been described with reference to the rule file.

A description is given of a case where the specified modules are "PCL6 Driver (core)", "PCL6 Driver (function A)", "PCL6 Driver (function B)", and "PCL6 Driver (function D)".

Referring back to FIG. 8, the "rule for function A" specifies "Any_Core, Must" and "PCL6_Core, IF_Opt, -pcl6". This means that for function A, a core module must be included, and when the core module is a PCL6 version, "-pcl6" is to be specified as an install option.

Specifically, function A includes a Locked Print function for each PDL, and can thus accommodate any core module. The rule specifies that when the core module is PCL6, function A is to be installed as a function for PCL6. Therefore, "-pcl6" is specified as an install option for the installer of function A.

This means that function A may include only a part of the function, which corresponds to PCL6. There is obviously no problem if the entire function of function A is included. However, if the core module is PCL6, it is only necessary to install the part of the function corresponding to PCL6. Accordingly, only a part of function A is installed, and therefore unnecessary functions and data can be reduced. When there are no particular rules for the function, function A is packaged such that the entire function A is included.

As described above, with the use of a rule file, the characteristics and properties of the functions are taken into consideration, and the install options are determined based on the characteristics of the functions. Thus, a driver such as a printer driver, which includes functions having various characteristics, can be installed without including unnecessary functions.

Referring back to FIG. 8, "rule for function B" specifies that function D is recommended for function B. Thus, function D is an extended function of function B, and therefore function D can only be added after function B has been added. For example, when function B is a basic tint block function and function D is an extended tint block function, the PC 2 needs to have the basic tint block function installed as the base function, in order to install and use the extended tint block function in the PC 2. This is because the extended function uses various process units of the basic function. Thus, the created install scenario describes that the functions are to be installed in the order of "PCL6 Driver (function B)", "PCL6 Driver (function D)". The install scenario should clearly indicate that the functions are not to be installed in the order of "PCL6 Driver (function D)", "PCL6 Driver (function B)".

As described above, with the use of the rule file, the characteristics of the functions are taken into consideration, and the order of installing the functions is determined based on the characteristics of the function. Thus, a driver such as a printer driver, which includes functions having various characteristics, can be reliably and correctly installed.

Referring back to FIG. 8, "rule for function B" defines "FuncD, IF_Opt, -Half". This means that although function D is an extended function of function B, only half or a part of function D (-Half) is required. There is obviously no problem if the entire function of function D is included (-Full). However, in consideration of the relationship with function B, function D can be sufficiently implemented with half or part of function D (-Half). Accordingly, only half or part of function D is installed, and therefore unnecessary functions and data can be reduced. When there are no particular rules for the function, function D is packaged such that the entire function D is included (-Full).

FIG. 14 illustrates an install scenario created in the above manner. The relationship between function B and function D is indicated. It is clearly indicated that ".\FuncD\Install.exe" is to be executed after ".\FuncB\Install.exe" has been executed (activated). As for function D, ".\FuncD\Install.exe -Half" is described, clearly indicating that half or part of function D (-Half) is to be installed.

<Modification>

Figure 15:
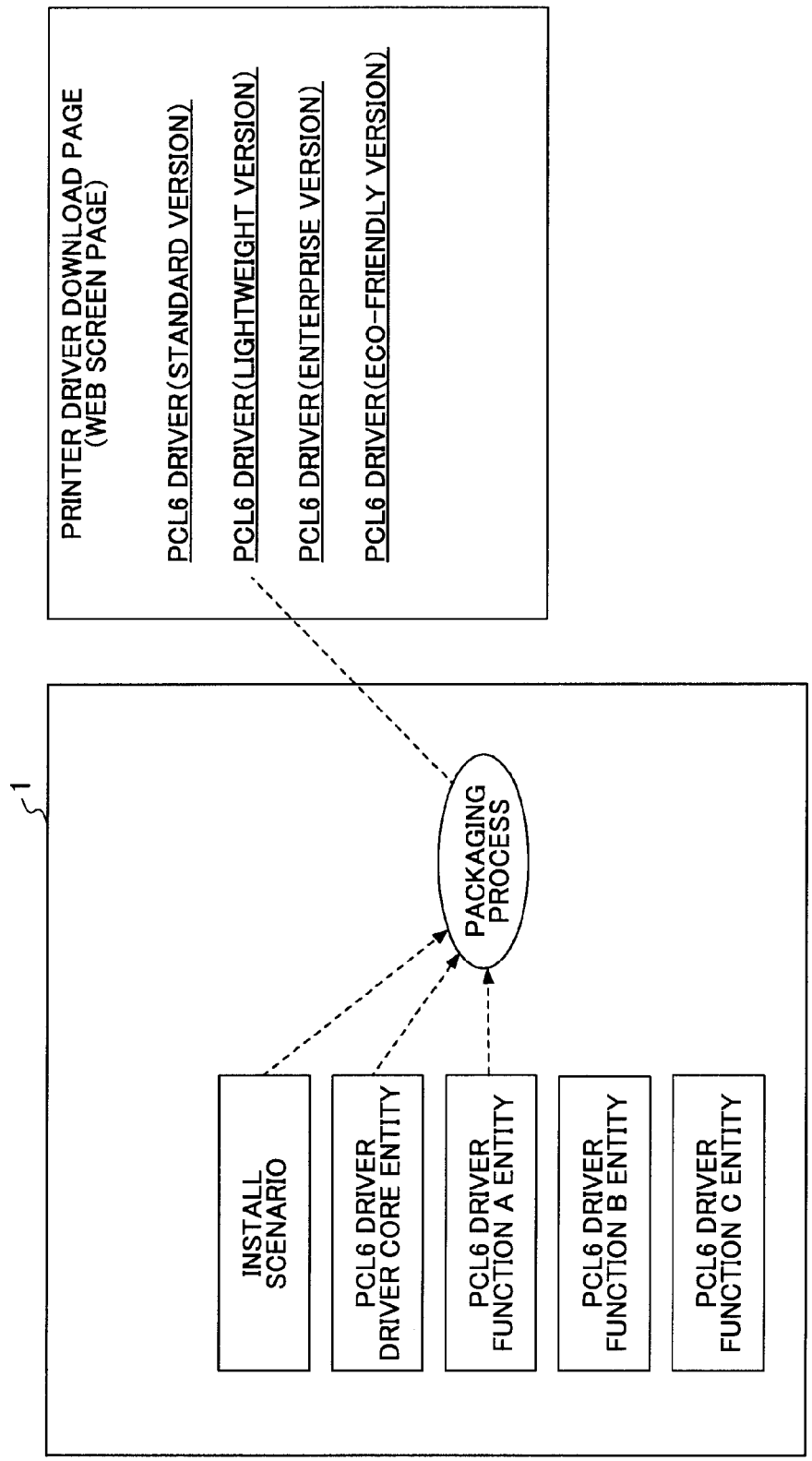
FIG. 15 illustrates another concept of acquiring a driver package from the server.

FIG. 15 illustrates another concept of acquiring a driver package from the server 1. In the printer driver download page illustrated in FIG. 9, the user simply checked the check boxes corresponding to the required functions.

In the printer driver download page illustrated in FIG. 15, different printer driver packages are provided according to the included functions. For example, a standard (recommended) version, a lightweight version, and an enterprise version are provided. The driver packages are provided in units that are made clear to the user by the concept or catch-phrase. Accordingly, compared to the case of presenting check boxes, the user can select a driver package that substantially matches his requirements based on the indicated concept, even when the user is unaware of the specific functions included in each of the driver packages.

In FIG. 15, when "PCL6 Driver (lightweight version)" is specified (selected), the server 1 identifies the specified function. In this case, "PCL6 Driver (function A entity)" is identified as the specified function module. Therefore, "install scenario", "PCL6 Driver (driver core entity)" (essential), and "PCL6 Driver (function A entity)" (specified) are packaged in the final driver package provided to the user.

The printer driver download page may be created by embedding the information of "PCL6 Driver (function A entity)" as the specified function module, in the link of the "PCL6 Driver (lightweight version)". In another example, a predetermined flag may be embedded in the link of the "PCL6 Driver (lightweight version)", and the function module corresponding to the predetermined flag may be determined at the server 1.

An embodiment of the present invention described above provides a server device and a computer-readable recording medium in which a driver package generating program is stored for generating a driver package that can be easily provided by the provider, whereby the driver package is generated such that only function modules required by the user are packaged and unnecessary functions are not packaged.

The present invention is not limited to the specifically disclosed embodiment, and variations and modifications may be made without departing from the scope of the present invention. For example, the present invention is not only applicable to printer driver packages, but also to peripheral devices including various functions having particular relationships.

The present application is based on Japanese Priority Application No. 2009-025293 filed on Feb. 5, 2009 with the Japan Patent Office, the entire contents of which are hereby incorporated by reference.

The invention claimed is:

1. A server device for providing a client device with a driver package including at least a core module of a driver, the server device comprising:
   circuitry configured as:
   a storage unit configured to store the core module, a group of function modules, and a rule file defining packaging conditions for the function modules included in the group of function modules, wherein the core module and the group of function modules are used as components of the driver package, wherein the core module includes a core installer for installing itself, and wherein each function module from the group of function modules includes a function installer for installing itself;

a receiving unit configured to receive, from the client device, a driver package request specifying one or more of the function modules from the group of function modules;

a determining unit configured to determine one or more of the function modules to be included in the driver package from the group of function modules, based on the one or more of the function modules from the group of function modules specified in the driver package request and the rule file;

an install scenario creating unit configured to create an install scenario defining an order of activating the core installer and the function installers included in the respective core module and function modules from the group of function modules, for installing the one or more of the function modules included in the driver package when the driver package is installed in the client device, wherein the install scenario is created based on the one or more of the function modules determined to be included in the driver package by the determining unit and the rule file; and a package generating unit configured to generate the driver package including the core module, the one or more of the function modules determined to be included in the driver package by the determining unit, the install scenario created by the install scenario creating unit, and a master installer for controlling installation of the driver package according to the install scenario.

2. The server device according to claim 1, wherein the rule file defines an exclusive relationship between the function modules included in the group of function modules; and the determining unit determines the one or more of the function modules to be included in the driver package based on the one or more of the function modules from the group of function modules specified in the driver package request and the exclusive relationship defined by the rule file.

3. The server device according to claim 1, wherein the rule file defines installation properties of the function modules included in the group of function modules; and the install scenario creating unit creates the install scenario that specifies the order of activating the core installer and the function installers and the installation properties of the one or more of the function modules determined to be included in the driver package by the determining unit.

4. The server device according to claim 1, the circuitry further configured as:

a reporting unit configured to send a report to the client device when the one or more of the function modules from the group of function modules specified in the driver package request and the one or more of the function modules determined to be included in the driver package by the determining unit are different.

5. A non-transitory computer-readable recording medium that stores therein a driver package generating program that causes a server device to execute a procedure for providing a client device with a driver package including at least a core module of a driver, the procedure comprising:

a storage step of storing the core module, a group of function modules, and a rule file defining packaging conditions for the function modules included in the group of function modules, wherein the core module and the group of function modules are used as components of the driver package, wherein the core module includes a core installer for installing itself, and wherein each function module from the group of function modules includes a function installer for installing itself;

a receiving step of receiving, from the client device, a driver package request specifying one or more of the function modules from the group of function modules;

a determining step of determining one or more of the function modules to be included in the driver package from the group of function modules, based on the one or more of the function modules from the group of function modules specified in the driver package request and the rule file;

an install scenario creating step of creating an install scenario defining an order of activating the core installer and the function installers included in the respective core module and function modules from the group of function modules, for installing the one or more of the function modules included in the driver package when the driver package is installed in the client device, wherein the install scenario is created based on the one or more of the function modules determined to be included in the driver package at the determining step and the rule file; and a package generating step of generating the driver package including the core module, the one or more of the function modules determined to be included in the driver package at the determining step, the install scenario created at the install scenario creating step, and a master installer for controlling installation of the driver package according to the install scenario.

6. The non-transitory computer-readable recording medium according to claim 5, wherein the storage step includes storing the rule file defines an exclusive relationship between the function modules included in the group of function modules; and the determining step includes determines the one or more of the function modules to be included in the driver package based on the one or more of the function modules from the group of function modules specified in the driver package request and the exclusive relationship defined by the rule file.

7. The non-transitory computer-readable recording medium according to claim 5, wherein the storage step includes storing the rule file defining installation properties of the function modules included in the group of function modules; and the install scenario creating step includes creating the install scenario that specifies the order of activating the core installer and the function installers and the installation properties of the one or more of the function modules determined to be included in the driver package at the determining step.

8. The non-transitory computer-readable recording medium according to claim 5, wherein the procedure further comprises:

a reporting step of sending a report to the client device when the one or more of the function modules from the group of function modules specified in the driver package request and the one or more of the function modules determined to be included in the driver package at the determining step are different.

* * * * *